Sept. 2, 1969   D. W. BODEN ET AL   3,464,656
HUBRING
Filed Jan. 31, 1968

Inventors
JULIUS F. KRUGER
DONALD W. BODEN

By *(signature)*
Attorney

United States Patent Office 3,464,656
Patented Sept. 2, 1969

3,464,656
HUBRING
Donald W. Boden, Ferguson, and Julius F. Kruger, Berkeley, Mo., assignors to Emerson Electric Co., St. Louis County, Mo., a corporation of Missouri
Filed Jan. 31, 1968, Ser. No. 702,102
Int. Cl. F16m 1/00; F16f 15/04
U.S. Cl. 248—15                              6 Claims

ABSTRACT OF THE DISCLOSURE

A motor mounting hubring consisting of a rubber inner ring and an annular metal outer ring bonded to the inner ring. The outer ring is split. From the split, the ring is cut back circumferentially from the split along spaced cuts and the axially outboard fingers thus defined are bent outward to form radially extending ears. The hubring, which is mounted on a support structure, is turned to a position at which the ears straddle the adjacent support structure, and the hubring is clamped to the support structure.

BACKGROUND OF THE INVENTION

This invention relates to hubrings for mounting an electric motor or the like to a support structure, and in particular to a means for stabilizing such rings on a support structure. The term hubring is used herein to denote any device which surrounds a portion of a piece of apparatus and has an outer edge which is mounted on a support structure. It is not limited either to a device which fits on the actual hub of a machine or to a circular ring. However, the illustrative embodiment of hubring of this invention, hereinafter described, has both of these characteristics.

In a variety of applications, such as the drive systems for clothes dryer drums, an electric motor is mounted on a support structure by means of hubrings the inner faces of which embrace the hubs of the motor and the rims of which are held against the support structure. These hubrings are frequently made in the form of a rubber inner ring, the inside circumference of which is proportioned to engage the hub of the motor, and a metallic outer ring. The outer surface of the outer ring is provided with a central annular channel or rabbet into which a portion of the support structure extends. This portion of the support structure is frequently in the form of a sheet metal arm having an arcuate aperture cut in its upper face and having a lip, of a width adapted to fit into the rabbet in the hubring, provided around the periphery of the aperture. The lip on the support structure is held tightly within the rabbet by means of a clamp. A convenient clamping method would be to provide tabs on the support structure adjacent the upper edge of a semicircular aperture, outboard of the aperture, and to provide a semicircular spring clip having slots near its free ends to engage the tabs on the support structure. Although this type of clamp has the virtue of being simple, light and inexpensive, it has not been completely effective in holding the hubring to the support frame under the severe conditions of vibration commonly met in the shipping and in use of clothes dryers, for example. Therefore, mountings using much more substantial clamps have been required heretofore.

One of the objects of this invention is to provide a hubring which resists disengagement from the structure on which it is mounted far better than hubrings known heretofore.

Another object is to provide such a hubring which may be mounted on a support structure by means of a simple spring clip.

Still another object is to provide such a hubring which is simple to manufacture and easy to install.

Other objects will occur to those skilled in the art in the light of the following description and accompanying drawing.

SUMMARY OF THE INVENTION

In accordance with this invention, generally stated, a hubring is provided comprising a ring provided with a rabbet on its outer face, and an ear projecting from the ring adjacent the rabbet.

In the preferred embodiment, the ring provided with the ear is the outer ring of a conventional hubring. Such rings are normally split, with the rabbet on one side of the split extended to form a tongue, and the rabbet on the other side of the split cut out, the remaining shoulder parts defining the sides of a groove to receive the tongue. In forming the hubring of this invention, the ear on the ring is conveniently provided by bending up at least one of the shoulder parts on the hubring adjacent the groove of the tongue and groove arrangement. Both shoulder parts are preferably bent up for additional stability.

Also in the preferred embodiment, the hubring is mounted in an arcuate seat in a support structure, and the margin of the seat abuts the rabbet in the hubring. Because the ears are immediately adjacent the split, and embrace the support structure, the rabbet on both sides of the split is held firmly against the support structure and the hubring is thereby protected from excessive lateral distortion. However, to provide additional stability, in another embodiment of hubring of this invention the tongue and groove are extended and only a portion of the shoulder adjacent the groove is turned up.

Also in the preferred embodiment, the circumferential position of the ear relative to an inward projection on an inner rubber ring is chosen so that when the motor to be mounted is placed in the hubring and turned to its proper orientation, the ears will lie adjacent the center of the margin of the seat.

DESCRIPTION OF THE PREFERRED EMBODIMENT

Figure 1:
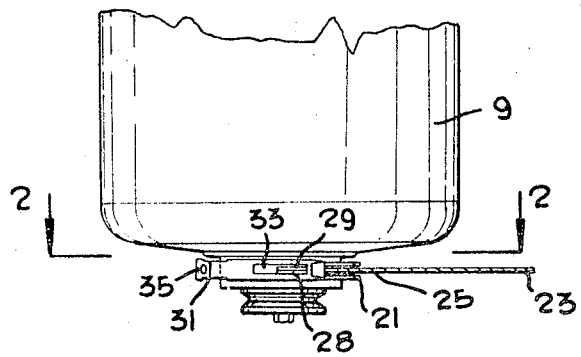
FIGURE 1 is a fragmentary top plan view of a motor mounted on a sheet metal housing by means of a hubring of this invention, clamped to the support structure by a spring clip.
Figure 6:
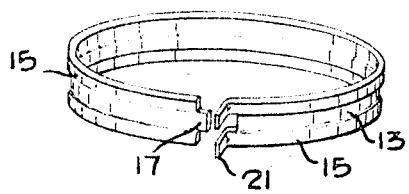
FIGURE 6 is a view in perspective of the outer ring of the hubring shown in FIGURES 1–5.

Referring now to the drawings, and in particular to FIGURES 1–6, reference numeral 1 indicates one illustrative embodiment of ring of this invention. The hubring 1 includes an outer ring 3 and a resilient inner ring or annulus 5. The outer ring 3 in this illustrative embodiment is made of 1/16 inch steel, and the inner ring 5 is made of neoprene.

The inner ring 5 is provided with four inwardly extending projections 7 which are adapted to engage depressions 11 on the hub of an electric motor 9.

The outer ring 3 is provided with a central annular channel 13 between shoulders 15 on its outer face. The outer ring 3 is split. On one side of the split the shoulders 15 are cut back, to form respectively a tongue 17 and a groove 19. The groove-defining shoulders 15 adjacent the groove 19 are bent outward to form radially extending ears 21.

The outer ring 3 is bonded to the inner ring 5 to form a complete hubring 1. The position chosen for the ears 21 relative to a protrusion 7 on the inner ring 5 depends on the position of the depressions 11 on the motor hub relative to the desired alignment of the motor 9. Generally, the position of the ears 21 should be such that when the motor 9 is in position, the ears 21 are adjacent the center of the abutting support structure on which the hubring 1 is mounted.

It will be seen that the hubring 1 is identical with a conventional hubring except for the ears 21 formed by the bending outward of the shoulders 15 adjacent the groove 19.

Figure 2:
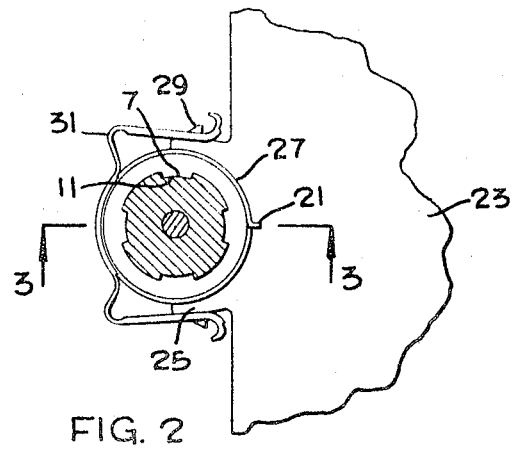
FIGURE 2 is a sectional view taken along the line 2—2 of FIGURE 1.
Figure 3:
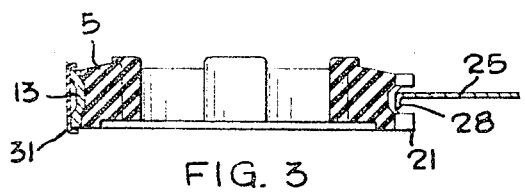
FIGURE 3 is a sectionaly view taken along the line 3—3 of FIGURE 2.
Figure 5:
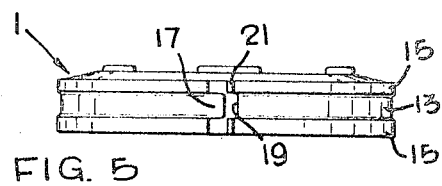
FIGURE 5 is a view in side elevation of the hubring shown in FIGURES 1–4.
Figure 4:
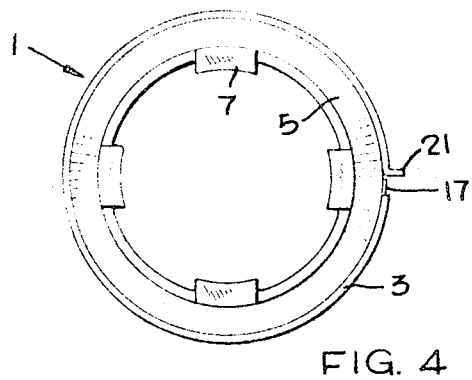
FIGURE 4 is a view in front elevation of the hubring shown in FIGURES 1–3.

The hubring 1 may be mounted on a support structure in a conventional manner. As shown in FIGURES 1-3, the support structure 23 may be a sheet metal panel of a clothes dryer, from the upper margin of which extends a support arm 25. The support arm 25 has a semicircular seat 27 at its free end, a seating surface of which is provided by a turned lip 28 of a width equal to, or slightly less than, the width of the channel 13 in the hubring 1. The seat 27 has the same radius of curvature as the channel 13. Near the free end of the arm 25, a pair of tabs 29 are provided on the arm 25 outboard of the seat 27. A spring clip 31 is provided for holding the hubring 1 tightly to the support arm 25. Slots 33 near the free ends of the arms of the spring clip 31 are adapted to engage the tabs 29, and teeth 35 struck down in the central web section of the spring clip 31 are adapted to engage the channel 13 on the hubring 1.

In use, the hub of the motor 9 is inserted into the hubring 1. The hubring 1 is placed on the semicircular seat 27 in the support arm 25, with the lip 28 on the support arm 25 abutting the channel 13. The ring is turned to a position at which the ears 21 straddle the lip 28 on a radius passing through the center of the arc of the semicircular seat 27. The spring clip 31 is then placed over the hubring 1 and its arms are deformed outwardly from the central web until the tabs 29 on the support arm 25 snap into the slots 33.

It has been found that the hubring of this invention provides a much more stable mounting than is obtained with hubrings known heretofore. For example, when a motor is mounted as shown in the illustrative embodiment of this invention, by means of a hubring not having the ears 21, it can be pulled from the mounting with three to four pounds of pressure applied in the proper direction. When mounted with the hubring of this invention, a force of 14 to 15 pounds applied in the same way can be withstood.

Figure 7:
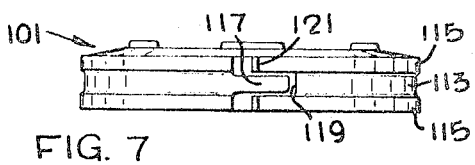
FIGURE 7 is a view in side elevation of another embodiment of hubring of this invention.

Because the hubring of this invention must be positioned with the ears 21 adjacent the support arm 25, the split in the outer ring 3 is always held against the support arm and is therefore protected against lateral distortion. If, however, additional protection against lateral distortion is desired, the tongue 17 and groove 19 may be made longer than those of the embodiment shown in FIGURES 1-6, and the shoulders on either side of the groove bent at the midpoint of the groove. In the embodiment shown in FIGURE 7, a hubring 101 is provided which is identical with the hubring shown in FIGURES 1-6, except that the shoulders 115 are cut back farther on one side of the split and the rabbet 113 cut back farther on the other side of the split. A tongue 117 thus extends into a groove 119, although ears 121 are bent out the same distance as the ears 21 in the first illustrative embodiment.

Numerous variations in the hubring of this invention, will occur to those skilled in the art in the light of the foregoing disclosure. For example, the tongue and groove may be modified in dimension or may be eliminated altogether. The tongue may also be bent out for engaging a slot in the support structure, to prevent rotation of the ring. The rabbet may be eliminated for some applications. For other applications, a single ear may be sufficient. Other inner rings, or none at all, may be used for mounting other pieces of apparatus to support structures. The hubring may be used with other support structures and other clamping means. These variations are merely illustrative.

Having thus described the invention, what is claimed to be secured by Letters Patent is:

1. Means for mounting a piece of apparatus having a hub to a support structure comprising a support arm on said support structure; a seat in said support arm; a seating surface on said seat, a hubring, said hubring comprising a resilient inner ring adapted to encompass said hub, and an outer ring having an outer face; an annular channel in said outer face, said annular channel receiving said seating surface; a lateral split in said outer ring; a radially outwardly turned ear on said outer ring, said ear being adjacent said seating surface; and clamping means holding said hubring to said seat, said clamping means engaging said support structure and said outer face of said outer ring.

2. The means of claim 1 including a pair of said radially outwardly turned ears, said ears straddling said seating surface.

3. The means of claim 1 wherein said resilient inner ring is in immediate engagement with said hub.

4. The means of claim 1 wherein said ear is provided adjacent an edge of said split in said outer ring.

5. The means of claim 4 wherein said channel terminates adjacent said edge.

6. The means of claim 4 wherein said channel terminates at a position spaced from said edge.

References Cited

UNITED STATES PATENTS

| | | | |
|---|---|---|---|
| 1,518,848 | 12/1924 | Hickox | 248—74 |
| 2,074,136 | 3/1937 | Welch | 248—26 |
| 2,178,077 | 10/1939 | Loftis | 248—26 |
| 2,729,846 | 1/1956 | Reed | 16—109 |
| 3,353,775 | 11/1967 | Sebo | 248—74 XR |

ROY D. FRAZIER, Primary Examiner

J. FRANKLIN FOSS, Assistant Examiner

U.S. Cl. X.R.

248—358; 16—109